United States Patent
Fujii et al.

(10) Patent No.: US 11,742,129 B2
(45) Date of Patent: Aug. 29, 2023

(54) ADHESIVELY-LAMINATED CORE, MANUFACTURING METHOD THEREOF, AND ELECTRIC MOTOR

(71) Applicant: NIPPON STEEL CORPORATION, Tokyo (JP)

(72) Inventors: Hiroyasu Fujii, Tokyo (JP); Shinsuke Takatani, Tokyo (JP); Kazutoshi Takeda, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 141 days.

(21) Appl. No.: 17/292,048

(22) PCT Filed: Dec. 17, 2019

(86) PCT No.: PCT/JP2019/049316
§ 371 (c)(1),
(2) Date: May 7, 2021

(87) PCT Pub. No.: WO2020/129951
PCT Pub. Date: Jun. 25, 2020

(65) Prior Publication Data
US 2021/0398734 A1 Dec. 23, 2021

(30) Foreign Application Priority Data
Dec. 17, 2018 (JP) ................. 2018-235871

(51) Int. Cl.
*H02K 1/04* (2006.01)
*H02K 1/18* (2006.01)
(Continued)

(52) U.S. Cl.
CPC ............ *H01F 27/245* (2013.01); *C09J 11/04* (2013.01); *H01F 41/0233* (2013.01); *H02K 1/04* (2013.01);
(Continued)

(58) Field of Classification Search
CPC .. H02K 1/04; H02K 1/18; H02K 1/30; H02K 15/02
(Continued)

(56) References Cited

U.S. PATENT DOCUMENTS 5,248,405 A  9/1993 Kaneda et al.
5,994,464 A  11/1999 Ohsawa et al.
(Continued)

FOREIGN PATENT DOCUMENTS

CN  102792556 A  11/2012
EP  3553799 A1  10/2019
(Continued)

OTHER PUBLICATIONS

Japanese Industrial Standard (JIS) C 2552: 2014, relevance discussed in specification.
(Continued)

*Primary Examiner* — Jose A Gonzalez Quinones
(74) *Attorney, Agent, or Firm* — Renner, Otto, Boisselle & Sklar, LLP (57) ABSTRACT

An adhesively-laminated core includes: a plurality of electrical steel sheets which are stacked on each other and of which both surfaces are coated with an insulation coating; and an adhesion part which is provided between the electrical steel sheets adjacent to each other in a stacking direction and adheres the electrical steel sheets to each other, wherein an adhesive forming the adhesion part contains an organic resin and an inorganic filler, wherein a 50% particle size of the inorganic filler is 0.2 to 3.5 μm, wherein a 90% particle size of the inorganic filler is 10.0 μm or less, and wherein an amount of the inorganic filler is 5 to 50 parts by mass with respect to 100 parts by mass of the organic resin.

7 Claims, 4 Drawing Sheets

(51) Int. Cl.
  *H02K 1/30*   (2006.01)
  *H02K 15/02*  (2006.01)
  *H01F 27/245* (2006.01)
  *C09J 11/04*  (2006.01)
  *H01F 41/02*  (2006.01)

(52) U.S. Cl.
  CPC .............. *H02K 1/18* (2013.01); *H02K 1/30* (2013.01); *H02K 15/02* (2013.01)

(58) Field of Classification Search
  USPC .................................. 310/216.065, 216.067
  See application file for complete search history.

(56) References Cited

U.S. PATENT DOCUMENTS

| | | |
|---|---|---|
| 10,340,754 B2 | 7/2019 | Ogino et al. |
| 2009/0195110 A1 | 8/2009 | Miyaki |
| 2010/0197830 A1 | 8/2010 | Hayakawa et al. |
| 2010/0219714 A1 | 9/2010 | Abe et al. |
| 2011/0269894 A1 | 11/2011 | Miyamoto |
| 2012/0088096 A1 | 4/2012 | Takeda et al. |
| 2012/0128926 A1 | 5/2012 | Ohishi et al. |
| 2015/0028717 A1 | 1/2015 | Luo et al. |
| 2015/0256037 A1 | 9/2015 | Kudose |
| 2015/0337106 A1 | 11/2015 | Kajihara |
| 2016/0023447 A1 | 1/2016 | Shimizu |
| 2017/0117758 A1 | 4/2017 | Nakagawa |
| 2017/0342519 A1 | 11/2017 | Uesaka et al. |
| 2018/0030292 A1 | 2/2018 | Gotou |
| 2018/0056629 A1 | 3/2018 | Hamamura |
| 2018/0159389 A1 | 6/2018 | Nishikawa |
| 2018/0212482 A1 | 7/2018 | Nigo |
| 2018/0295678 A1 | 10/2018 | Okazaki et al. |
| 2018/0342925 A1 | 11/2018 | Horii et al. |
| 2019/0010361 A1 | 1/2019 | Hoshi |
| 2020/0186014 A1 | 6/2020 | Kusuyama |
| 2021/0296975 A1 | 9/2021 | Hino et al. |

FOREIGN PATENT DOCUMENTS

| | | |
|---|---|---|
| EP | 3562006 A1 | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009-177895 A | 8/2009 |
| JP | 2010-004716 A | 1/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-120299 A | 6/2012 |
| JP | 2013-089883 A | 5/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017011863 A * | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018-145492 A | 9/2018 |
| JP | 2018138634 A * | 9/2018 |
| KR | 20180110157 A * | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | WO-2018093130 A1 * | 5/2018 ............ C08F 210/06 |
| WO | 2018/105473 A1 | 6/2018 |
| WO | 2018/138864 A1 | 8/2018 |
| WO | 2018/216565 A1 | 11/2018 |
| WO | 2020/129921 A1 | 6/2020 |
| WO | 2020/129923 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |

(56) References Cited

FOREIGN PATENT DOCUMENTS

| WO | 2020/129942 A1 | 6/2020 |
| WO | 2020/129946 A1 | 6/2020 |
| WO | 2020/129948 A1 | 6/2020 |

OTHER PUBLICATIONS

Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016, relevance discussed in specification.
Japanese Industrial Standard (JIS) K 7121-1987.
Japanese Industrial Standard (JIS) K 6850: 1999.
The papers of technical meetings in the Institute of Elecliical Engineers of Japan,RM-92-79, 1992.
Matweb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

\* cited by examiner

ADHESIVELY-LAMINATED CORE, MANUFACTURING METHOD THEREOF, AND ELECTRIC MOTOR

TECHNICAL FIELD

The present invention relates to an adhesively-laminated core, a manufacturing method thereof, and an electric motor.

Priority is claimed on Japanese Patent Application No. 2018-235871, filed Dec. 17, 2018, the content of which is incorporated herein by reference.

BACKGROUND ART

Conventionally, an adhesively-laminated core used in motors, transformers, and the like is known. The adhesively-laminated core has a configuration in which a plurality of thin electrical steel sheets are stacked and are integrated with each other by an adhesive. In the adhesively-laminated core, it is difficult to maintain flatness in accordance with an increase in the number of the stacked electrical steel sheets. In the adhesively-laminated core having poor flatness, the adhesively-laminated core may not stand upright, the adhesively-laminated core may be tilted, the accuracy of the adhesively-laminated core may not be stable, and magnetic properties of the adhesively-laminated core may deteriorate.

In order to solve such problems, for example, Patent Document 1 proposes an adhesively-laminated core in which electrical steel sheets are adhered to each other by an adhesive containing an epoxy resin and a rubber component and the amount of the adhesive squeezed out from the outer peripheral portion of the electrical steel sheet is suppressed. The adhesively-laminated core of Patent Document 1 attempts to improve the accuracy of the film thickness of the adhesion part.

CITATION LIST

Patent Document

[Patent Document 1]
Japanese Unexamined Patent Application, First Publication No. 2014-096429

SUMMARY OF THE INVENTION

Problems to be Solved by the Invention

However, in the adhesively-laminated core of Patent Document 1, there is still room for further improving flatness and improving space factor.

The present invention has been made in view of the above-described circumstances and an object of the present invention is to provide an adhesively-laminated core capable of further improving flatness and improving space factor, a manufacturing method thereof, and an electric motor.

Means for Solving the Problem

It is considered that the expansion or contraction of the adhesion part can be suppressed when an inorganic filler is blended with the adhesion part for adhering the electrical steel sheets to each other.

When the expansion of the adhesion part is suppressed, it is easy to improve the space factor of the adhesively-laminated core. An increase in the space factor of the adhesively-laminated core means an increase in the ratio of the electrical steel sheet in the cross-section of the adhesively-laminated core in the stacking direction. This means that the magnetic field lines can be formed at a high density when the magnetic field lines are generated inside the adhesively-laminated core by excitation from the winding current. That is, an increase in the space factor of the adhesively-laminated core means the improvement of magnetic properties of the adhesively-laminated core.

When the 50% particle size of the inorganic filler contained in the adhesion part is small, it is considered that the adhesively-laminated core can easily stand up, can be easily flattened, and increase the space factor.

However, the present inventors have found that the flatness of the adhesively-laminated core is determined not only by the 50% particle size (the center particle size) of the inorganic filler or the average particle size of the inorganic filler (the arithmetic mean of the particle size of all particles of the inorganic filler) but also by the 90% particle size of the inorganic filler or the maximum particle size of the inorganic filler. That is, the present inventors have found that the flatness of the adhesively-laminated core is determined by a component having a large particle size in the population of particles of the inorganic filler.

It is considered that the coarse particles dominate the gaps between the electrical steel sheets when the "coarse particles" are present in the population of inorganic filler particles even when the 50% particle size or the average particle size of the inorganic filler is small.

The present inventors have carried out careful examination in order to solve the above-described problems. As a result, the present inventors have found that the flatness of the adhesively-laminated core can be further improved and the space factor of the adhesively-laminated core can be improved by decreasing the 50% particle size of the inorganic filler contained in the adhesion part and decreasing the 90% particle size of the inorganic filler contained in the adhesion part and completed the present invention. That is, the present invention has the following aspects.

(1) A first aspect of the present invention is an adhesively-laminated core including: a plurality of electrical steel sheets which are stacked on each other and of which both surfaces are coated with an insulation coating; and an adhesion part which is provided between the electrical steel sheets adjacent to each other in a stacking direction and adheres the electrical steel sheets to each other, wherein an adhesive forming the adhesion part contains an organic resin and an inorganic filler, wherein a 50% particle size of the inorganic filler is 0.2 to 3.5 µm, wherein a 90% particle size of the inorganic filler is 10.0 µm or less, and wherein an amount of the inorganic filler is 5 to 50 parts by mass with respect to 100 parts by mass of the organic resin.

(2) In the adhesively-laminated core according to the above (1), a maximum particle size of the inorganic filler may be 30.0 µm or less.

(3) In the adhesively-laminated core according to the above (1) or (2), the inorganic filler may contain one or more selected from metal oxide and metal hydroxide.

(4) In the adhesively-laminated core according to any one of the above (1) to (3), the inorganic filler may contain one or more selected from aluminum hydroxide and aluminum oxide.

(5) The adhesively-laminated core according to any one of the above (1) to (4) may be for a stator.

(6) A second aspect of the present invention is a method of manufacturing the adhesively-laminated core according to any one of the above (1) to (5), wherein an operation of applying the adhesive to a part of a surface of the electrical steel sheet, stacking the electrical steel sheet on another electrical steel sheet, press-stacking the electrical steel sheets, and forming the adhesion part is repeated.

(7) A third aspect of the present invention is an electric motor including the adhesively-laminated core according to any one of the above (1) to (5).

Effects of the Invention

According to the adhesively-laminated core of the present invention, it is possible to further improve flatness and to improve space factor.

EMBODIMENTS FOR IMPLEMENTING THE INVENTION

Hereinafter, an adhesively-laminated core according to an embodiment of the present invention and an electric motor including the adhesively-laminated core will be described with reference to the drawings. Additionally, in this embodiment, an electric motor as a motor, specifically, an AC motor, more specifically, a synchronous motor, and even more specifically, a permanent magnetic electric motor will be described as an example. Such a motor is suitably used in, for example, an electric vehicle or the like.

Figure 1:
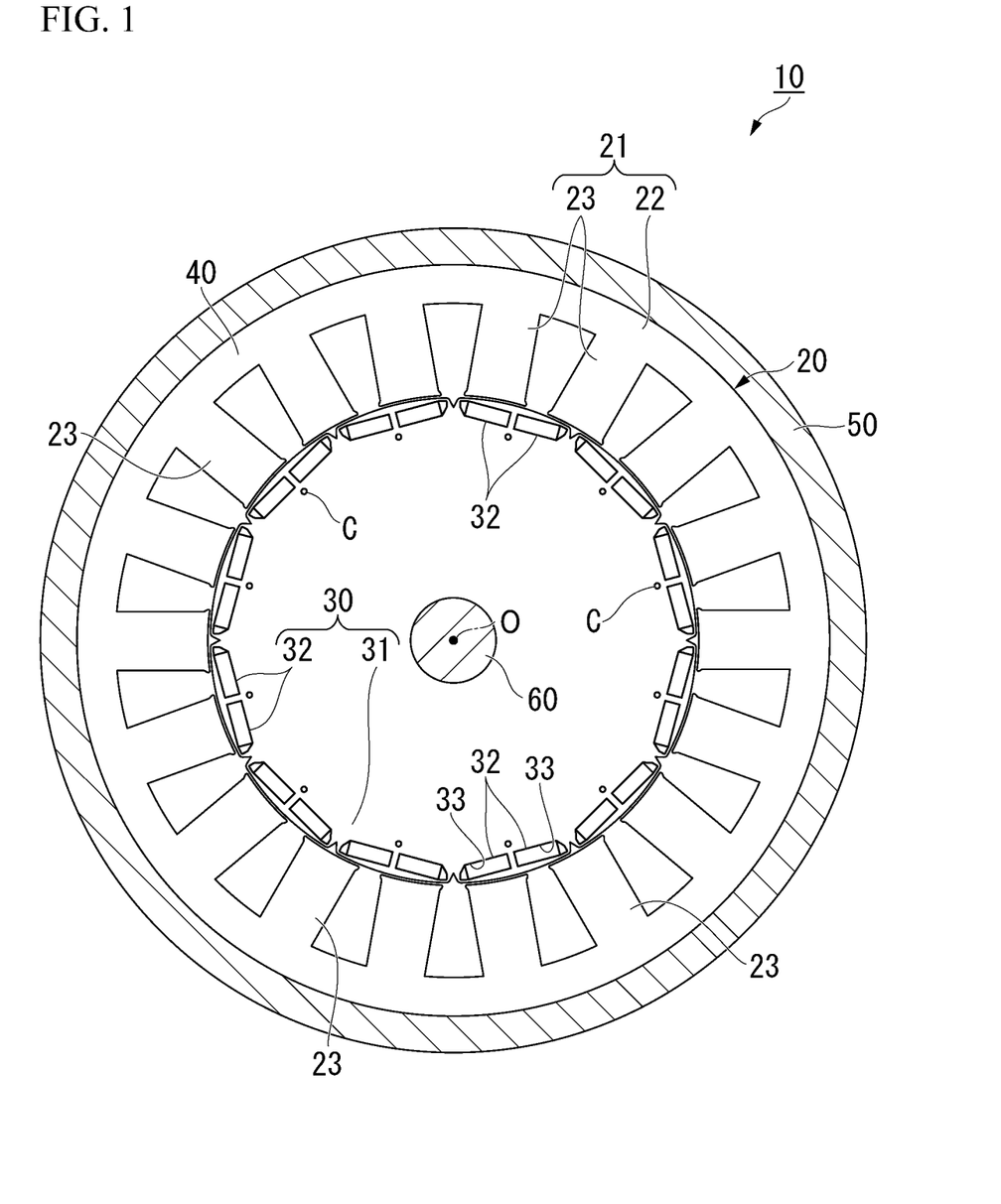
FIG. 1 is a cross-sectional view of an electric motor including an adhesively-laminated core according to an embodiment of the present invention.

As shown in FIG. 1, an electric motor 10 includes a stator 20, a rotor 30, a casing 50, and a rotation shaft 60. The stator 20 and the rotor 30 are accommodated in the casing 50.

The stator 20 is fixed to the casing 50.

In this embodiment, the electric motor 10 is of an inner rotor type in which the rotor 30 is located on the inside of the stator 20. However, the electric motor 10 may be of an outer rotor type in which the rotor 30 is located on the outside of the stator 20. Further, in this embodiment, the electric motor 10 is a 12-pole and 18-slot three-phase AC motor. However, the number of poles, the number of slots, the number of phases, and the like can be changed as appropriate.

The electric motor 10 can rotate at a rotation speed of 1000 rpm, for example, by applying an excitation current having an effective value of 10 A and a frequency of 100 Hz to each phase.

The stator 20 includes a stator core 21 and a winding (not shown).

The stator core 21 includes an annular core back part 22 and a plurality of tooth parts 23. Hereinafter, the direction of the center axis O of the stator core 21 (or the core back part 22) is referred to as the axial direction, the radial direction (the direction orthogonal to the center axis O) of the stator core 21 (or the core back part 22) is referred to as the radial direction, and the circumferential direction (the direction to orbit around the center axis O) of the stator core 21 (or the core back part 22) is referred to as the circumferential direction.

The core back part 22 is formed in an annular ring shape in a plan view when the stator 20 is viewed from the axial direction.

The plurality of tooth parts 23 protrude from the core back part 22 inward in the radial direction (toward the center axis O of the core back part 22 in the radial direction). The plurality of tooth parts 23 are arranged at equal intervals in the circumferential direction. In this embodiment, eighteen tooth parts 23 are provided at the intervals of the center angles of 20° around the center axis O. The plurality of tooth parts 23 are formed to have the same shape and the same size.

The winding is wound around the tooth part 23. The winding may be a concentrated winding or a distributed winding.

The rotor 30 is disposed on the inside of the radial direction with respect to the stator 20 (or the stator core 21). The rotor 30 includes a rotor core 31 and a plurality of permanent magnets 32.

The rotor core 31 is formed in an annular shape (annular ring shape) to be arranged coaxially with the stator 20. The rotation shaft 60 is disposed inside the rotor core 31. The rotation shaft 60 is fixed to the rotor core 31.

The plurality of permanent magnets 32 are fixed to the rotor core 31. In this embodiment, a set of two permanent magnets 32 forms one magnetic pole. A plurality of sets of permanent magnets 32 are arranged at equal intervals in the circumferential direction. In this embodiment, twelve sets (twenty four in total) of permanent magnets 32 are provided at the intervals of the center angles of 30° around the center axis O.

In this embodiment, an interior permanent magnet motor is employed as the permanent magnetic electric motor.

A plurality of through holes 33 penetrating the rotor core 31 in the axial direction are formed in the rotor core 31. The plurality of through holes 33 are provided to correspond to the plurality of permanent magnets 32. Each permanent magnet 32 is fixed to the rotor core 31 while being disposed inside the corresponding through hole 33. Each permanent magnet 32 can be fixed to the rotor core 31, for example, in such a manner that the outer surface of the permanent magnet 32 and the inner surface of the through hole 33 are adhered to each other by an adhesive. Additionally, as the permanent magnetic electric motor, a surface permanent magnet motor may be used instead of the interior permanent magnet motor.

Figure 2:
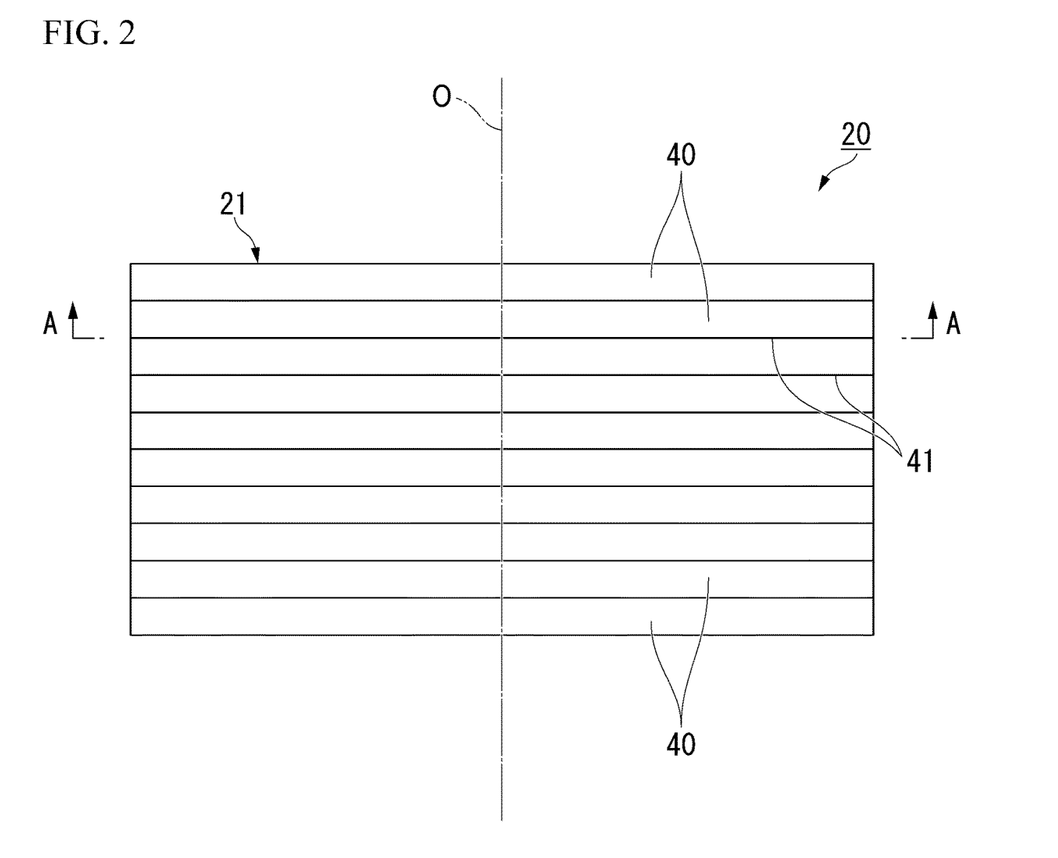
FIG. 2 is a side view of the adhesively-laminated core shown in FIG. 1.

Both the stator core 21 and the rotor core 31 are adhesively-laminated cores. As shown in FIG. 2, the stator 20 is formed by stacking a plurality of electrical steel sheets 40.

In the stator 20, an adhesion part 41 for adhering these electrical steel sheets 40 is provided between the electrical steel sheets 40 which are adjacent to each other in the stacking direction and the electrical steel sheets 40 are adhered to each other by the adhesion part 41. That is, in the stator 20, the plurality of electrical steel sheets 40 forming the stator core 21 are stacked with the adhesion part 41 interposed therebetween.

The lamination thickness of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the lamination thickness, outer diameter, or inner diameter of the stator core 21 and the lamination thickness, outer diameter, or inner diameter of the rotor core 31 are not limited to these values. Here, the inner diameter of the stator core 21 is based on the tip of the tooth part 23 of the stator core 21. The inner diameter of the stator core 21 is the diameter of the virtual circle inscribed in the tips of all tooth parts 23.

Each of the electrical steel sheets 40 forming the stator core 21 and the rotor core 31 is formed, for example, by punching an electrical steel sheet as a base material. A known electrical steel sheet can be used for the electrical steel sheet 40. The chemical composition of the electrical steel sheet 40 is not particularly limited. In this embodiment, a non-grain-oriented electrical steel sheet is employed as the electrical steel sheet 40. As the non-grain-oriented electrical steel sheet, for example, a non-grain-oriented electrical steel strip of JIS C 2552: 2014 can be employed.

However, as the electrical steel sheet 40, a grain-oriented electrical steel sheet can be employed instead of the non-grain-oriented electrical steel sheet. As the grain-oriented electrical steel sheet, a grain-oriented electrical steel strip of JIS C 2553: 2012 can be employed.

In order to improve the workability of the electrical steel sheet or the iron loss of the laminated core, an insulation coating is provided on both surfaces of the electrical steel sheet 40. As a material constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, (3) phosphate, and the like. Examples of the organic resin include an epoxy resin, an acrylic resin, an acrylic styrene resin, a polyester resin, a silicone resin, a fluororesin, and the like.

The organic resin may be the same as or different from the organic resin contained in the adhesive described later.

In order to ensure the insulating performance between the electrical steel sheets 40 stacked with each other, the thickness of the insulation coating (thickness per one side of the electrical steel sheet 40) is preferably 0.1 µm or more.

On the other hand, the insulation effect becomes saturated as the insulation coating becomes thick. Further, as the insulation coating becomes thick, a space factor decreases and the performance as the adhesively-laminated core decreases. Thus, the insulating coating should be as thin as possible in the range capable of ensuring the insulation performance. The thickness of the insulation coating (the thickness per one side of the electrical steel sheet 40) is preferably 0.1 µm or more and 5 µm or less. The thickness of the insulation coating is more preferably 0.1 µm or more and 2 µm or less.

The thickness of the insulation coating can be measured, for example, by observing the cut surface of the electrical steel sheet 40 cut in the thickness direction with a microscope or the like.

As the electrical steel sheet 40 becomes thin, the iron loss improvement effect gradually becomes saturated. Further, the manufacturing cost of the electrical steel sheet 40 increases as the electrical steel sheet 40 becomes thin. Therefore, the thickness of the electrical steel sheet 40 is preferably 0.10 mm or more in consideration of the iron loss improvement effect and the manufacturing cost.

On the other hand, when the electrical steel sheet 40 is too thick, the press punching work of the electrical steel sheet 40 becomes difficult. Therefore, the thickness of the electrical steel sheet 40 is preferably 0.65 mm or less in consideration of the press punching work of the electrical steel sheet 40.

Further, the iron loss increases as the electrical steel sheet 40 becomes thick. Therefore, the thickness of the electrical steel sheet 40 is preferably 0.35 mm or less, more preferably 0.25 mm or less, and even more preferably 0.20 mm or less in consideration of the iron loss characteristics of the electrical steel sheet 40.

In consideration of the above points, the thickness of each electrical steel sheet 40 is, for example, preferably 0.10 mm or more and 0.65 mm or less, more preferably 0.10 mm or more and 0.35 mm or less, even more preferably 0.10 mm or more and 0.25 mm or less, and particularly preferably 0.10 mm or more and 0.20 mm or less. Further, the thickness of the electrical steel sheet 40 also includes the thickness of the insulation coating.

The thickness of the electrical steel sheet 40 can be measured by, for example, a micrometer or the like.

Figure 3:
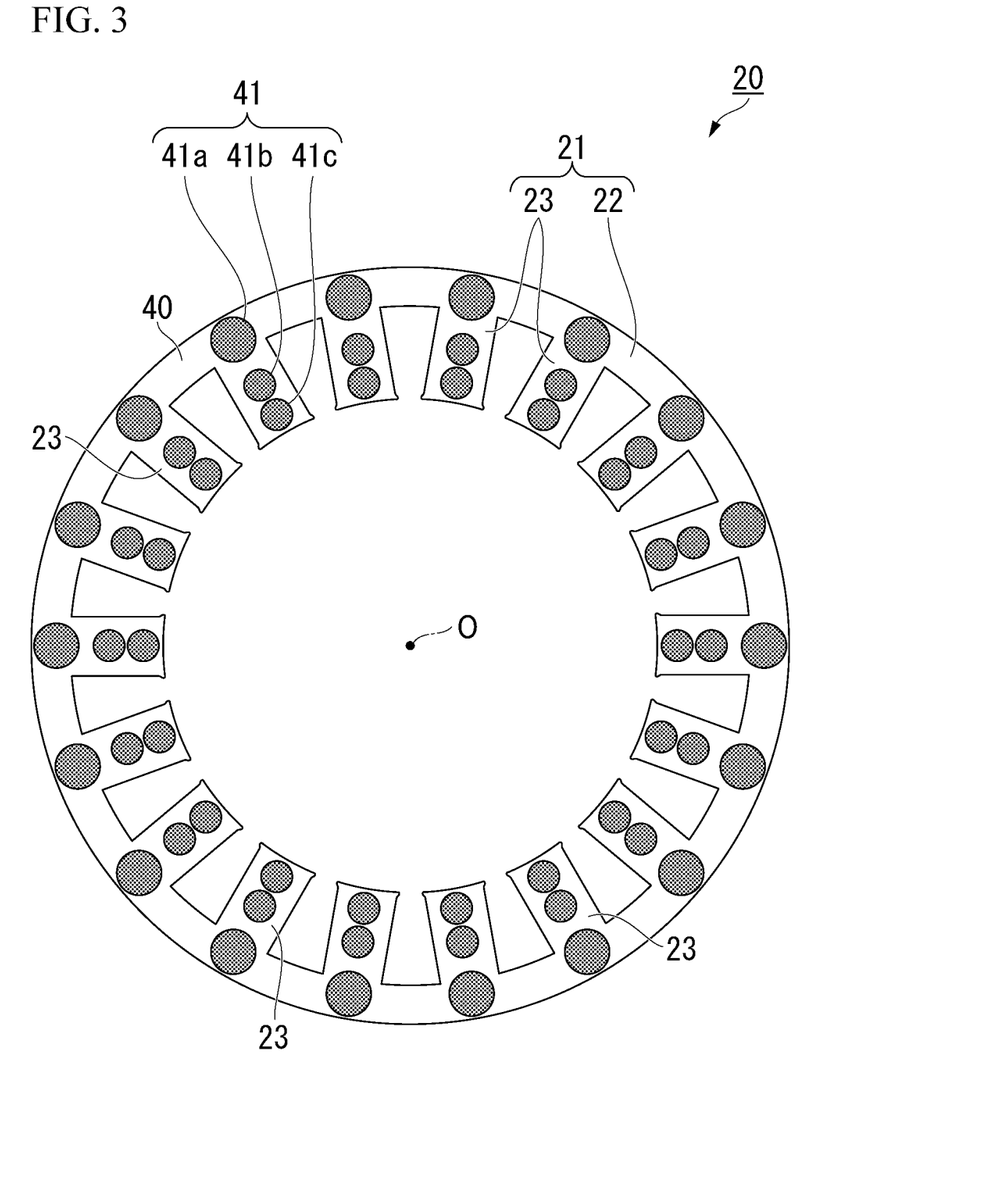
FIG. 3 is a cross-sectional view of A-A of FIG. 2.

As shown in FIG. 3, the plurality of electrical steel sheets 40 forming the stator core 21 are stacked with the adhesion part 41 interposed therebetween. The adhesion part 41 is formed in the core back part 22 and the tooth part 23 of the stator core 21. The adhesion part 41 is formed from the inner periphery of the core back part 22 inward in the radial direction (toward the center axis O of the core back part 22 in the radial direction) as adhesion parts 41a, 41b, and 41c. The plurality of tooth parts 23 are respectively provided with the adhesion parts 41b and 41c. The adhesion part 41a is formed in each of the core back part 22 at a position corresponding to the plurality of tooth parts 23.

The adhesion part 41 is a layer which is formed by an adhesive containing an organic resin and an inorganic filler.

The organic resin constituting the adhesive is not particularly limited and examples thereof include a polyolefin resin, an acrylic resin, a polyurethane resin, an epoxy resin, a polyamide resin, a polyimide resin, a polyester resin, a silicone resin, and a fluororesin.

As the organic resin, an acrylic modified epoxy resin obtained by graft-polymerizing an acrylic resin on an epoxy resin is preferable from the viewpoint of easily increasing the adhesion strength of the adhesion part 41.

Examples of the epoxy resin include those obtained by condensing epichlorohydrin and bisphenol in the presence of an alkaline catalyst, those obtained by condensing epichlorohydrin and bisphenol into a low molecular weight epoxy resin in the presence of an alkaline catalyst and subjecting the low molecular weight epoxy resin and bisphenol to a polyaddition reaction, and the like. Here, the "low molecular weight epoxy resin" means an epoxy resin having a number average molecular weight smaller than 1200.

The epoxy resin may be an epoxy ester resin in which a divalent carboxylic acid is combined. Examples of the divalent carboxylic acid include succinic acid, adipic acid, pimelic acid, azelaic acid, sebacic acid, dodecanedioic acid, hexahydrophthalic acid and the like.

Examples of bisphenol include bisphenol A, bisphenol F, bisphenol AD, and the like, and bisphenol A and bisphenol F are preferable.

Examples of the alkaline catalyst include sodium hydroxide, potassium hydroxide, and the like.

One type of these epoxy resins may be used alone or two or more types may be used in combination.

The number average molecular weight of the epoxy resin is preferably 1200 to 8000, more preferably 2000 to 7000, and even more preferably 2500 to 7000. When the number average molecular weight of the epoxy resin is equal to or larger than the lower limit value, it is easy to increase the adhesion strength of the adhesion part 41. When the number average molecular weight of the epoxy resin is equal to or smaller than the upper limit value, it is easy to increase the stability of the adhesion part 41.

The number average molecular weight of the epoxy resin can be measured by size-exclusion chromatography (SEC) described in JIS K 7252-1: 2008 using polystyrene as a standard substance.

The amount of the epoxy resin is, for example, preferably 30 to 90% by mass, more preferably 40 to 80% by mass, and even more preferably 50 to 70% by mass with respect to the total mass of the adhesive. When the amount of the epoxy resin is equal to or larger than the lower limit value, it is easy to increase the adhesion strength of the adhesion part 41. When the amount of the epoxy resin is equal to or smaller than the upper limit value, it is easy to alleviate the strain generated in the electrical steel sheet 40.

Examples of the acrylic resin include an acrylic resin obtained by polymerizing or copolymerizing at least one selected from unsaturated carboxylic acids such as acrylic acid, methacrylic acid, maleic acid, itaconic acid, and crotonic acid, an acrylic resin obtained by copolymerizing at least one monomer selected from the unsaturated carboxylic acids and at least one selected from the following radically polymerizable unsaturated monomers, and the like.

Examples of the radically polymerizable unsaturated monomers include (1) hydroxyalkyl esters of acrylic acid or methacrylic acid with 1 to 8 carbon atoms, such as 2-hydroxyethyl acrylate, 2-hydroxyethyl methacrylate, hydroxypropyl acrylate, and hydroxypropyl methacrylate, (2) alkyl esters or cycloalkyl esters of acrylic acid or methacrylic acid with 1 to 24 carbon atoms, such as methyl acrylate, methyl methacrylate, ethyl acrylate, ethyl methacrylate, n-butyl acrylate, n-butyl methacrylate, isobutyl acrylate, isobutyl methacrylate, tert-butyl acrylate, tert-butyl methacrylate, cyclohexyl acrylate, cyclohexyl methacrylate, 2-ethylhexyl acrylate, 2-ethylhexyl methacrylate, lauryl acrylate, lauryl methacrylate, stearyl acrylate, stearyl methacrylate, and decyl acrylate, (3) functional acrylamides or functional methacrylamides, such as acrylamide, methacrylamide, N-methylacrylamide, N-ethylacrylamide, diacetoneacrylamide, N-methylolacrylamide, N-methylolmethacrylamide, N-methoxymethylacrylamide, and N-butoxymethylacrylamide, (4) aromatic vinyl monomers such as styrene, vinyltoluene, and α-methylstyrene, (5) aliphatic vinyl monomers such as vinyl acetate, vinyl propionate, acrylonitrile, and methacrylonitrile, and the like.

Preferred combinations of the above unsaturated monomers include, for example, a combination of methyl methacrylate, 2-ethylhexyl acrylate, and acrylic acid, a combination of styrene, methyl methacrylate, ethyl acrylate, and methacrylic acid, a combination of styrene, ethyl acrylate, and methacrylic acid, a combination of methyl methacrylate, ethyl acrylate, and acrylic acid, and the like.

The number average molecular weight of the acrylic resin is preferably 5,000 to 100,000, more preferably 6,000 to 80,000, and even more preferably 7,000 to 60,000. When the number average molecular weight of the acrylic resin is equal to or larger than the lower limit value, it is easy to increase the adhesion strength of the adhesion part 41. When the number average molecular weight of the acrylic resin is equal to or smaller than the upper limit value, it is easy to suppress the high viscosity of the adhesive and to flatten the adhesion part 41.

The number average molecular weight of the acrylic resin can be measured by the same method as the number average molecular weight of the epoxy resin.

The amount of the acrylic resin is, for example, preferably 10 to 40% by mass, more preferably 15 to 35% by mass, and even more preferably 20 to 30% by mass with respect to the total mass of the adhesive. When the amount of the acrylic resin is equal to or larger than the lower limit value, it is easy to increase the adhesion strength of the adhesion part 41. When the amount of the acrylic resin is equal to or smaller than the upper limit value, it is easy to suppress the high viscosity of the adhesive and to flatten the adhesion part 41. Therefore, it is easy to suppress the strain of the adhesively-laminated core.

An acrylic modified epoxy resin (hereinafter, also referred to as "grafted product") obtained, for example, by graft-polymerizing an acrylic resin on an epoxy resin can be obtained by subjecting the above-described radically polymerizable unsaturated monomer to a graft polymerization reaction on a high molecular weight epoxy resin in the presence of a radical generator such as benzoyl peroxide in an organic solvent solution. Here, the "high molecular weight epoxy resin" means an epoxy resin having a number average molecular weight of 1200 or more.

The radical generator used in the graft polymerization reaction is preferably 3 to 15 parts by mass with respect to 100 parts by mass of the solid content of the radically polymerizable unsaturated monomer.

The graft polymerization reaction can be performed, for example, by adding a radically polymerizable unsaturated monomer, which is uniformly mixed with a radical generator, to an organic solvent solution of a high molecular weight epoxy resin heated at 80 to 150° C. over 1 to 3 hours and maintaining the temperature over 1 to 3 hours.

The organic solvent used in the graft polymerization reaction may be any organic solvent that dissolves the high molecular weight epoxy resin and the radically polymerizable unsaturated monomer and can be mixed with water.

Examples of such an organic solvent include alcohol solvent such as isopropanol, butyl alcohol, 2-hydroxy-4-methylpentane, 2-ethylhexyl alcohol, cyclohexanol, ethylene glycol, diethylene glycol, 1,3-butylene glycol, ethylene glycol monoethyl ether, ethylene glycol monobutyl ether, and diethylene glycol monomethyl ether, ketone solvent such as acetone and methyl ethyl ketone, cellosolve solvent, and carbitol solvent. Further, an inert organic solvent that is immiscible with water can also be used and examples of such an organic solvent include aromatic hydrocarbons such as toluene and xylene, and esters such as ethyl acetate and butyl acetate.

When the adhesive contains an epoxy resin, the curing agent can be a commonly used epoxy resin curing agent. As the epoxy resin curing agent, for example, at least one selected from polyamine-based curing agents such as aliphatic polyamines, alicyclic polyamines, aromatic polyamines, polyamide polyamines, and modified polyamines; acid anhydride-based curing agents such as monofunctional acid anhydride (phthalic anhydride, hexahydrophthalic anhydride, methyltetrahydrophthalic anhydride, methylhexahydrophthalic anhydride, methylnadic anhydride, chlorendic anhydride, and the like), bifunctional acid anhydrides (pyromellitic anhydride, benzophenone tetracarboxylic acid anhydride, ethylene glycol bis(anhydrotrimate), methylcyclohexenetetracarboxylic acid anhydride, and the like), and free acid anhydride (trimellitic anhydride, polyazelaic anhydride, and the like); initial condensate containing methylol groups such as a novolac type or resol type phenol resin, a urea resin, and a melamine resin; and latent curing agents can be used.

Examples of the latent curing agent include dicyandiamide, melamine, organic acid dihydrazide, amineimide, ketimine, tertiary amine, imidazole salt, boron trifluoride amine salt, a microcapsule type curing agent (a substance in which a curing agent is encapsulated in microcapsules formed of casein or the like and the microcapsules are broken by heating and pressurizing to perform a curing reaction with a resin), a molecular sieve type curing agent (a substance in which a curing agent is adsorbed on the surface of an adsorptive compound, which releases adsorbed molecules by heating and undergoes a curing reaction with a resin), and the like.

As the epoxy resin curing agent, a novolac type phenol resin (phenol novolac resin) is preferable from the viewpoint of easily increasing the adhesion strength of the adhesion part 41. Here, the "novolac type phenol resin" means a resin obtained by subjecting phenols and aldehydes to a condensation reaction using an acid catalyst.

Examples of phenols include phenol.

Examples of aldehydes include formaldehyde.

Examples of the acid catalyst include oxalic acid and divalent metal salts.

The novolac type phenol resin is solid at a room temperature (25° C.) and is classified as a thermoplastic resin. In the novolac type phenol resin, —$CH_2OH$ groups are hardly bonded to the phenol nuclei (aromatic rings) constituting the phenol resin.

The amount of the epoxy resin curing agent is preferably 1 to 20% by mass, for example, with respect to the total mass of the adhesive. When the amount of the epoxy resin curing agent is equal to or larger than the lower limit value, it is easy to increase the adhesion strength of the adhesion part 41. When the amount of the epoxy resin curing agent is equal to or smaller than the upper limit value, it is easy to increase the stability of the adhesion part 41.

The adhesive may contain an elastomer. Examples of the elastomer include natural rubber and synthetic rubber and synthetic rubber is preferable.

Examples of the synthetic rubber include polybutadiene-based synthetic rubber, nitrile-based synthetic rubber, and chloroprene-based synthetic rubber.

Examples of the polybutadiene synthetic rubber include isoprene rubber (IR), butadiene rubber (BR), styrene butadiene rubber (SBR), polyisobutylene (butyl rubber, IIR), and ethylene propylene diene rubber (EPDM).

Examples of the nitrile-based synthetic rubber include acrylonitrile butadiene rubber (NBR) and acrylic rubber (ACM).

Examples of the chloroprene-based synthetic rubber include chloroprene rubber (CR).

As the synthetic rubber, urethane rubber, silicone rubber, fluororubber (FKM), chlorosulfonated polyethylene (CSM), epichlorohydrin rubber (ECO), and the like may be used in addition to the above examples.

As the elastomer, SBR, EPDM, and NBR are preferable from the viewpoints of excellent heat resistance and easy relaxation of strain generated in the electrical steel sheet 40.

One type of elastomer may be used alone or two or more types may be used in combination.

The amount of the elastomer is preferably 5 to 30% by mass with respect to the total mass of the adhesive. When the amount of the elastomer is equal to or larger than the lower limit value, it is easy to alleviate the strain generated in the electrical steel sheet 40.

When the amount of the elastomer is equal to or smaller than the upper limit value, it is easy to increase the adhesion strength of the adhesion part 41.

The amount of the organic resin is, for example, preferably 40 to 95% by mass, more preferably 50 to 90% by mass, and even more preferably 60 to 80% by mass with respect to the total mass of the adhesive. When the amount of the organic resin is equal to or larger than the lower limit value, it is easy to increase the adhesion strength of the adhesion part 41. When the amount of the organic resin is equal to or smaller than the upper limit value, it is easy to suppress the high viscosity of the adhesive and to flatten the adhesion part 41. Therefore, it is easy to suppress the strain of the adhesively-laminated core.

Examples of the inorganic filler include metal oxides such as aluminum oxide (α-alumina), zinc oxide, titanium oxide, calcium oxide, magnesium oxide, iron oxide, and tin oxide; metal hydroxides such as aluminum hydroxide (gibbsite), calcium hydroxide, and magnesium hydroxide; silicon-containing substances such as silica, diatomaceous earth, calcium silicate, and talc; sulfates such as calcium sulfate, magnesium sulfate, and barium sulfate, and the like.

One type of inorganic filler may be used alone or two or more types may be used in combination.

As the inorganic filler, one or more selected from metal oxides and metal hydroxides is preferable, one or more selected from aluminum hydroxide and aluminum oxide is more preferable, and aluminum hydroxide is even more preferable from the viewpoint of low cost and easy availability.

The 50% particle size of the inorganic filler is 0.2 to 3.5 μm, preferably 0.4 to 3.0 μm, and more preferably 0.6 to 2.5 μm. When the 50% particle size of the inorganic filler is equal to or larger than the lower limit value, it is easy to suppress the expansion or contraction of the adhesion part 41. When the 50% particle size of the inorganic filler is equal to or smaller than the upper limit value, it is easy to increase the space factor of the adhesively-laminated core.

When the inorganic filler is a metal oxide, the 50% particle size of the inorganic filler is preferably 1.0 to 3.5 μm, more preferably 1.5 to 3.2 μm, and even more preferably 2.0 to 3.0 μm.

When the inorganic filler is a metal hydroxide, the 50% particle size of the inorganic filler is preferably 0.2 to 3.0 μm, more preferably 0.5 to 2.5 μm, and even more preferably 1.0 to 2.0 μm.

The 90% particle size of the inorganic filler is 10.0 μm or less, preferably 8.0 μm or less, and even more preferably 6.0 μm or less. When the 90% particle size of the inorganic filler is equal to or smaller than the upper limit value, it is easy to flatten the adhesion part 41. Therefore, it is easy to suppress the strain of the adhesively-laminated core. The lower limit value of the 90% particle size of the inorganic filler is not particularly limited, but is substantially 2.0 μm.

When the inorganic filler is a metal oxide, the 90% particle size of the inorganic filler is preferably 10.0 μm or less, more preferably 9.5 μm or less, and even more preferably 9.0 μm or less.

When the inorganic filler is a metal hydroxide, the 90% particle size of the inorganic filler is preferably 9.0 μm or less, more preferably 8.0 μm or less, and even more preferably 7.0 μm or less.

In the present specification, the 50% particle size and the 90% particle size represent the volume-based particle size in the cumulative particle size distribution. The 50% particle size and the 90% particle size can be measured by using a laser diffraction/scattering particle size distribution measuring device. The 50% particle size represents the particle size when the integrated amount occupies 50% on a volume basis in the cumulative particle size curve of the particle size distribution measured using a laser diffraction/scattering particle size distribution measuring device. The 90% particle size represents the particle size when the integrated amount occupies 90% on a volume basis in the cumulative particle size curve of the particle size distribution measured using a laser diffraction/scattering particle size distribution measuring device.

The 90% particle size of the inorganic filler can be adjusted by a method of allowing the inorganic filler to pass through a sieve having a specific opening, a wind power classification method, or the like.

The maximum particle size of the inorganic filler is preferably 30.0 µm or less, more preferably 20.0 µm or less, and even more preferably 10.0 µm or less. When the maximum particle size of the inorganic filler is equal to or smaller than the upper limit value, it is easy to flatten the adhesion part 41. Therefore, it is easy to suppress the strain of the adhesively-laminated core.

The lower limit value of the maximum particle size of the inorganic filler is not particularly limited, but is substantially 3.0 µm.

When the inorganic filler is a metal oxide, the maximum particle size of the inorganic filler is preferably 20.0 µm or less, more preferably 15.0 µm or less, and even more preferably 10.0 µm or less.

When the inorganic filler is a metal hydroxide, the maximum particle size of the inorganic filler is preferably 15.0 µm or less, more preferably 10.0 µm or less, and even more preferably 8.0 µm or less.

The maximum particle size of the inorganic filler can be measured using a laser diffraction/scattering particle size distribution measuring device. The maximum particle size of the inorganic filler is given by the maximum value of all particles measured using a laser diffraction/scattering particle size distribution measuring device. The maximum particle size of the inorganic filler can be adjusted by a method of allowing the inorganic filler to pass through a sieve having a specific opening, a wind power classification method, or the like.

The amount of the inorganic filler is 5 to 50 parts by mass, preferably 5 to 40 parts by mass, more preferably 5 to 30 parts by mass, and even more preferably 10 to 30 parts by mass with respect to 100 parts by mass of the organic resin. When the amount of the inorganic filler is equal to or larger than the lower limit value, it is easy to suppress the expansion or contraction of the adhesion part 41. When the amount of the inorganic filler is equal to or smaller than the upper limit value, it is easy to increase the space factor of the adhesively-laminated core.

When the inorganic filler is a metal oxide, the amount of the inorganic filler is preferably 10 to 50 parts by mass, more preferably 15 to 40 parts by mass, and even more preferably 20 to 30 parts by mass with respect to 100 parts by mass of the organic resin.

When the inorganic filler is a metal hydroxide, the amount of the inorganic filler is preferably 5 to 45 parts by mass, more preferably 10 to 40 parts by mass, and even more preferably 15 to 35 parts by mass with respect to 100 parts by mass of the organic resin.

The adhesive of this embodiment may contain an arbitrary component in addition to the organic resin and the inorganic filler. Examples of the arbitrary component include conductive substances, rust preventive additives such as sparingly soluble chromate, coloring pigments (for example, condensed polycyclic organic pigments, phthalocyanine organic pigments, and the like), coloring dyes (for example, azo dyes, azo metal complex salt dyes, and the like), deposition aid, dispersibility improver, defoaming agent, and the like.

These arbitrary components may be used alone or in combination of two or more.

When the adhesive contains an arbitrary component, the amount of the arbitrary component is preferably 1 to 10 parts by mass with respect to 100 parts by mass of the organic resin.

As the adhesive of this embodiment, a radical polymerization type adhesive or the like other than thermosetting adhesive can be also used. From the viewpoint of productivity, a room temperature curing type adhesive is preferable. The room temperature curing type adhesive is cured at 20° C. to 30° C. As the room temperature curing type adhesive, an acrylic-based adhesive is preferable. As the representative acrylic-based adhesive, a second generation acrylic-based adhesive (SGA) or the like is known. All of an anaerobic adhesive, an instant adhesive, and an elastomer-containing acrylic-based adhesive can be used as long as the effects of the present invention are not impaired. Additionally, the adhesive mentioned herein refers to the state before curing. When the adhesive is cured, the adhesion part 41 is obtained.

An average tensile modulus of elasticity E at a room temperature (20° C. to 30° C.) of the adhesion part 41 is set in the range of 1500 MPa to 4500 MPa. When the average tensile modulus of elasticity E of the adhesion part 41 is smaller than 1500 MPa, a problem arises in that the rigidity of the laminated core decreases. Therefore, the lower limit value of the average tensile modulus of elasticity E of the adhesion part 41 is set to 1500 MPa and more preferably 1800 MPa. In contrast, when the average tensile modulus of elasticity E of the adhesion part 41 exceeds 4500 MPa, a problem arises in that the insulation coating formed on the surface of the electrical steel sheet 40 is peeled off. Therefore, the upper limit value of the average tensile modulus of elasticity E of the adhesion part 41 is set to 4500 MPa and more preferably 3650 MPa.

Additionally, the average tensile modulus of elasticity E is measured by a resonance method. Specifically, the tensile modulus of elasticity is measured based on JIS R 1602: 1995.

More specifically, a measurement sample (not shown) is prepared first. This sample can be obtained by adhering two electrical steel sheets 40 by an adhesive which is a measurement object and curing the adhesive to form the adhesion part 41. When the adhesive is of a thermosetting type, this curing is performed by heating and pressurizing under the heating and pressurizing conditions in actual operation. On the other hand, when the adhesive is of a room temperature curing type, this curing is performed by pressurizing under a room temperature.

Then, the tensile modulus of elasticity for this sample is measured by a resonance method. A method of measuring the tensile modulus of elasticity according to the resonance method is performed based on JIS R 1602: 1995 as described above. Then, the tensile modulus of elasticity of the adhesion part 41 alone can be obtained by removing the influence of the electrical steel sheet 40 itself from the tensile modulus of elasticity (measured value) of the sample by calculation.

Since the tensile modulus of elasticity obtained from the sample in this way becomes equal to the average value of the whole laminated core, this value is regarded as the average tensile modulus of elasticity E. The composition of the average tensile modulus of elasticity E is set so that the stacking position in the stacking direction or the circumferential position around the center axis of the laminated core is almost unchanged. Therefore, the average tensile modulus of elasticity E can be set to a value obtained by measuring at the cured adhesion part 41 at the upper end position of the stator core.

As an adhering method, for example, a method of applying the adhesive to the electrical steel sheet 40 and adhering the electrical steel sheets by one or both of the heating and press-stacking can be employed. Further, the heating means may be any means such as heating in a high temperature bath or an electric furnace or a method of directly energizing.

In order to obtain stable and sufficient adhesion strength, the thickness of the adhesion part 41 is preferably 1 µm or more.

On the other hand, when the thickness of the adhesion part 41 exceeds 100 µm, an adhesion force becomes saturated. Further, as the adhesion part 41 becomes thick, a surface factor decreases and magnetic properties such as iron loss of the adhesively-laminated core decrease. Thus, the thickness of the adhesion part 41 is preferably 1 µm or more and 100 µm or less and more preferably 1 µm or more and 10 µm or less.

In the description above, the thickness of the adhesion part 41 means the average thickness of the adhesion part 41.

The average thickness of the adhesion part 41 is preferably 1.0 µm or more and 3.0 µm or less. When the average thickness of the adhesion part 41 is smaller than 1.0 µm, a sufficient adhesion force can be secured as described above. Therefore, the lower limit value of the average thickness of the adhesion part 41 is 1.0 µm and more preferably 1.2 µm. In contrast, when the average thickness of the adhesion part 41 becomes thicker than 3.0 µm, a problem arises in that the strain amount of the electrical steel sheet 40 largely increases due to cure shrinkage during thermosetting. Therefore, the upper limit value of the average thickness of the adhesion part 41 is 3.0 µm and more preferably 2.6 µm.

The average thickness of the adhesion part 41 is an average value of the adhesively-laminated core as a whole. The average thickness of the adhesion part 41 is almost unchanged depending on the stacking position in the stacking direction or the circumferential position around the center axis of the adhesively-laminated core. Therefore, the average thickness of the adhesion part 41 can be set to the average value of the numerical values measured at ten or more positions in the circumferential direction at the upper end position of the adhesively-laminated core.

Additionally, the average thickness of the adhesion part 41 can be adjusted by changing, for example, the adhesive application amount. Further, the average tensile modulus of elasticity E of the adhesion part 41 can be adjusted by changing one or both of the heating and pressurizing conditions applied at the time of adhesion and the types of the curing agent, for example, in the case of the thermosetting adhesive.

In this embodiment, the plurality of electrical steel sheets 40 constituting the rotor core 31 are fixed to each other by fastening C (dowel). However, the plurality of electrical steel sheets 40 forming the rotor core 31 may be adhered to each other by the adhesion part 41.

Additionally, the adhesively-laminated core such as the stator core 21 or the rotor core 31 may be formed by so-called turn-stacking.

Hereinafter, an adhesively-laminated core manufacturing method according to an embodiment of the present invention will be described with reference to the drawings.

The stator core 21 can be manufactured by repeating the operation of applying the adhesive to a part of the surface of the electrical steel sheet 40, stacking the electrical steel sheet on another electrical steel sheet, press-stacking the electrical steel sheets, and forming the adhesion part 41.

Hereinafter, a method of manufacturing the stator core 21 using the manufacturing device 100 shown in FIG. 4 will be described.

First, the manufacturing device 100 will be described. In the manufacturing device 100, an original steel sheet P is punched multiple times to be gradually changed into the shape of the electrical steel sheet 40 while being fed from the winding Q (the hoop) in the direction of an arrow F, the adhesive is applied to a predetermined position of the lower surface of the second and subsequent electrical steel sheets 40, and the punched electrical steel sheets 40 are sequentially stacked and press-stacked.

Figure 4:
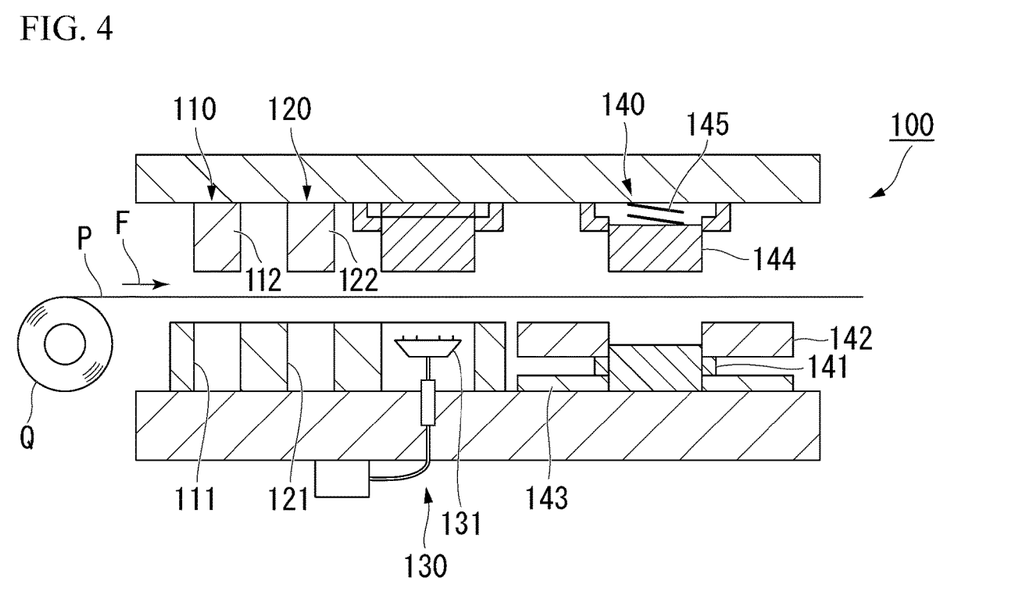
FIG. 4 is a side view showing a schematic configuration of an adhesively-laminated core manufacturing device.

As shown in FIG. 4, the manufacturing device 100 includes a first-stage punching station 110 which is closest to the winding Q, a second-stage punching station 120 which is disposed to be close to the downstream side in the conveying direction of the original steel sheet P in relation to the punching station 110, and an adhesive-coating station 130 which is disposed to be close to the further downstream side in relation to the punching station 120.

The punching station 110 includes a fixed mold 111 which is disposed below the original steel sheet P and a male mold 112 which is disposed above the original steel sheet P.

The punching station 120 includes a fixed mold 121 which is disposed below the original steel sheet P and a male mold 122 which is disposed above the original steel sheet P.

The adhesive-coating station 130 includes an applicator 131 having a plurality of injectors disposed according to the adhesive application pattern.

The manufacturing device 100 further includes a stacking station 140 which is disposed at a position on the downstream side of the adhesive-coating station 130. The stacking station 140 includes a heating device 141, a fixed mold 142 for outer shape, a heat insulation member 143, a male mold 144 for outer shape, and a spring 145.

The heating device 141, the fixed mold 142 for outer shape, and the heat insulation member 143 are disposed below the original steel sheet P. On the other hand, the male mold 144 for outer shape and the spring 145 are disposed above the original steel sheet P.

In the manufacturing device 100, the original steel sheet P is first sequentially fed in the direction of an arrow F of FIG. 4 from the winding Q. Then, the original steel sheet P is first punched by the punching station 110. Next, this original steel sheet P is punched by the punching station 120. By these punching processes, the original steel sheet P can have a shape of the electrical steel sheet 40 having the core back part 22 and the plurality of tooth parts 23 shown in FIG. 3 (punching step). However, since the steel sheet is not completely punched at this point, the process proceeds to the next step in the direction of an arrow F. In the adhesive-coating station 130 of the next step, the adhesive supplied from each injector of the applicator 131 is applied in a dot shape (applying step).

Next, the original steel sheet P is fed to the stacking station 140, is punched by the male mold 144 for outer shape, and is stacked with high accuracy (stacking step). At the time of stacking, the electrical steel sheet 40 receives a constant pressure from the spring 145. When the punching step, the applying step, and the stacking step described above are repeated sequentially, a predetermined number of electrical steel sheets 40 can be stacked. The iron core which is formed by stacking the electrical steel sheets 40 in this way is heated to, for example, 60 to 200° C. by the heating device 141. The adhesive is cured by heating so that the adhesion part 41 is formed (curing step).

With the aforementioned steps, the stator core 21 is completed.

As described above, in the electric motor and the adhesively-laminated core according to this embodiment, the plurality of electrical steel sheets of which both surfaces are coated with an insulation coating are stacked and the electrical steel sheets adjacent to each other in the stacking direction are adhered to each other by the adhesion part formed by the adhesive containing the organic resin and the inorganic filler. Since the electrical steel sheets are adhered to each other by the adhesion part, it is possible to obtain sufficient adhesion strength. Since the adhesion part contains the inorganic filler, it is possible to suppress the expansion or contraction of the adhesion part.

In addition, each adhesion part contains 5 to 50 parts by mass of the inorganic filler of which the 50% particle size is 0.2 to 3.5 μm and the 90% particle size is 10.0 μm or less with respect to 100 parts by mass of the organic resin. Therefore, the electric motor and the adhesively-laminated core according to this embodiment can easily decrease a gap between the electrical steel sheets. As a result, it is possible to further improve the flatness of the adhesively-laminated core and the space factor of the adhesively-laminated core.

The adhesively-laminated core according to this embodiment can further improve flatness and improve space factor. Therefore, the adhesively-laminated core according to this embodiment is suitable as the adhesively-laminated core for a stator (the stator core). The adhesively-laminated core may be used as the rotor core.

The technical scope of the present invention is not limited to the aforementioned embodiment and various modifications can be made without departing from the gist of the present invention.

The shape of the stator core is not limited to the form shown in the aforementioned embodiment. Specifically, the dimensions of the outer diameter and the inner diameter of the stator core, the lamination thickness, the number of slots, the dimensional ratio between the circumferential direction and the radial direction of the tooth part 23, the dimensional ratio between the tooth part 23 and the core back part 22 in the radial direction, and the like can be arbitrarily designed according to the characteristic of the desired electric motor.

In the rotor of the aforementioned embodiment, one set of two permanent magnets 32 forms one magnetic pole, but the present invention is not limited thereto. For example, one permanent magnet 32 may form one magnetic pole and three or more permanent magnets 32 may form one magnetic pole.

In the aforementioned embodiment, an example in which the electric motor is a permanent magnetic electric motor has been described, but the structure of the electric motor is not limited thereto as shown below. The structure of the electric motor may further employ various known structures not shown below.

In the aforementioned embodiment, an example in which the synchronous motor is a permanent magnetic electric motor has been described, but the present invention is not limited thereto. For example, the electric motor may be a reluctance motor or an electromagnet field motor (a wound-field motor).

In the aforementioned embodiment, an example in which the AC motor is a synchronous motor has been described, but the present invention is not limited thereto. For example, the electric motor may be an induction motor.

In the aforementioned embodiment, an example in which the motor is an AC motor has been described, but the present invention is not limited thereto. For example, the electric motor may be a DC motor.

In the aforementioned embodiment, an example in which the electric motor is a motor has been described, but the present invention is not limited thereto. For example, the electric motor may be a generator.

In the aforementioned embodiment, a case in which the laminated core according to the present invention is applied to the stator core has been exemplified, but the laminated core can be also applied to the rotor core.

In addition, it is possible to replace the components in the above embodiment with well-known components as appropriate without departing from the gist of the present invention. Further, the aforementioned modified examples may be appropriately combined with each other.

EXAMPLES

Examples 1 to 6, Comparative Examples 1 to 4

A hoop with a thickness of 0.25 mm was prepared, an insulation coating treatment solution containing a metal phosphate and an acrylic resin emulsion was applied to both surfaces of the hoop, the hoop was baked at 300° C., and an insulation coating of 0.8 μm per one surface was formed.

The hoop having the insulation coating formed thereon was wound up to form the winding Q. The winding Q was set on the manufacturing device 100 and the original steel sheet P was fed from the winding Q in the direction of an arrow F. A single plate (electrical steel sheet 40) having an annular shape with an outer diameter of 300 mm and an inner diameter of 240 mm and having eighteen rectangular tooth parts with a length of 30 mm and a width of 15 mm formed on the inner radial side was formed by punching using the manufacturing device 100 (punching step).

Next, the adhesive having a composition shown in Table 1 was applied in dots so that 5 mg of the adhesive was applied at each position shown in FIG. 3 while the punched electrical steel sheets were sequentially fed (applying step) and the electrical steel sheets were stacked (stacking step). By repeating the same operation, a laminated body in which 130 electrical steel sheets were stacked was obtained. The obtained laminated body was heated at 120° C. while being pressed at the pressure of 10 MPa to cure the adhesive (curing step) so that the adhesively-laminated core of each example was manufactured.

In Table 1, the types of each component are as follows.

<Organic Resin>

Acrylic modified epoxy resin (epoxy resin: bisphenol F type, 60% by mass, acrylic resin: polymer of acrylic acid, 20% by mass, curing agent: novolac type phenolic resin, 20% by mass).

<Inorganic Filler>

A1: Aluminum hydroxide (50% particle size 1.5 μm, 90% particle size 6.5 μm, maximum particle size 7.0 μm).

A2: Aluminum oxide (50% particle size 2.5 μm, 90% particle size 8.5 μm, maximum particle size 9.5 μm).

A'1: Silicon dioxide (50% particle size 1.5 μm, 90% particle size 12.0 μm, maximum particle size 15.0 μm).

A'2: Magnesium oxide (50% particle size 2.5 μm, 90% particle size 15.5 μm, maximum particle size 21.0 μm).

In Table 1, the unit of composition of each component is parts by mass.

In Table 1, "-" indicates that the component is not included.

<Evaluation of Flatness>

The adhesively-laminated core obtained in each example was placed on a flat base and the height of the adhesively-laminated core was measured at eighteen positions corresponding to the tooth parts 23 of FIG. 3. A difference (ΔH) between the maximum value and the minimum value of the height of the adhesively-laminated core was calculated and was divided by the average value (the average height) of the height of the adhesively-laminated core to obtain the flatness (ΔH/average height×100(%)). The average height is the arithmetic mean value of the above 18 positions. The flatness of the adhesively-laminated core was evaluated based on the evaluation criteria as below. As the flatness becomes smaller, the flatness becomes excellent. The result is shown in Table 1.

<<Evaluation Criteria>>

A: Flatness smaller than 2%.

B: Flatness equal to or larger than 2% and smaller than 5%.

C: Flatness equal to or larger than 5%.

<Evaluation of Space Factor>

The space factor (%) of the adhesively-laminated core obtained in each example was calculated.

In the present specification, the space factor of the adhesively-laminated core is given by the following formula.

$$\text{Space factor (\%)} = M/(D \cdot h \cdot S) \times 100$$

Here, M indicates the mass (kg) of the adhesively-laminated core, D indicates the density (kg/m$^3$) of the steel sheet (the electrical steel sheet excluding the insulation coating), h indicates the average height (m) of the adhesively-laminated core, and S indicates the area (m$^2$) of the electrical steel sheet in the plan view. The area S of the electrical steel sheet was determined by capturing the electrical steel sheet before stacking as an image with a scanner and performing image analysis.

From the value of the calculated space factor, the space factor was evaluated based on the evaluation criteria as below. The result is shown in Table 1.

<<Evaluation Criteria>>

A: Space factor equal to or larger than 99%.

B: Space factor equal to or larger than 98% and smaller than 99%.

C: Space factor smaller than 98%.

TABLE 1

|  |  |  | EXAMPLE 1 | EXAMPLE 2 | EXAMPLE 3 | EXAMPLE 4 | EXAMPLE 5 | EXAMPLE 6 |
|---|---|---|---|---|---|---|---|---|
| COMPOSITION | ORGANIC RESIN |  | 100 | 100 | 100 | 100 | 100 | 100 |
| (PARTS BY | INORGANIC | A1 | 5 | 10 | 30 | 50 | — | 10 |
| MASS) | FILLER | A2 | — | — | — | — | 30 | 10 |
|  |  | A'1 | — | — | — | — | — | — |
|  |  | A'2 | — | — | — | — | — | — |
| EVALUATION | FLATNESS (%) |  | 1.6 | 1.7 | 1.9 | 3.4 | 3.9 | 1.9 |
|  | EVALUATION RESULT |  | A | A | A | B | B | A |
|  | SPACE FACTOR (%) |  | 99.3 | 99.2 | 99.0 | 98.7 | 98.6 | 99.1 |
|  | EVALUATION RESULT |  | A | A | A | B | B | A |

|  |  |  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|
| COMPOSITION | ORGANIC RESIN |  | 100 | 100 | 100 | 100 |
| (PARTS BY | INORGANIC | A1 | 3 | 60 | — | — |
| MASS) | FILLER | A2 | — | — | — | — |
|  |  | A'1 | — | — | 30 | — |
|  |  | A'2 | — | — | — | 30 |
| EVALUATION | FLATNESS (%) |  | 2.1 | 5.1 | 6.6 | 7.7 |
|  | EVALUATION RESULT |  | B | C | C | C |
|  | SPACE FACTOR (%) |  | 97.9 | 97.5 | 97.1 | 96.8 |
|  | EVALUATION RESULT |  | C | C | C | C |

As shown in Table 1, in Examples 1 to 6 having adopted the present invention, all of the flatness and the space factor were "A" or "B".

On the other hand, in Comparative Example 1 in which the amount of the inorganic filler was smaller than that of the range of the present invention, the space factor was "C".

In Comparative Example 2 in which the amount of the inorganic filler was larger than the range of the present invention, the flatness and the space factor were "C".

In Comparative Examples 3 and 4 in which the 90% particle size of the inorganic filler was outside the range of the present invention, the flatness and the space factor were "C".

From the above-described result, it was found that the adhesively-laminated core of the present invention can further improve the flatness and the space factor.

INDUSTRIAL APPLICABILITY

According to the present invention, the adhesively-laminated core can further improve the flatness and improve the space factor. Thus, the industrial applicability is great.

BRIEF DESCRIPTION OF THE REFERENCE SYMBOLS

10 Electric motor
20 Stator
21 Stator core (adhesively-laminated core)
40 Electrical steel sheet
41 Adhesion part

The invention claimed is:

1. An adhesively-laminated core comprising:
a plurality of electrical steel sheets which are stacked on each other and of which both surfaces are coated with an insulation coating; and
an adhesion part which is provided between the electrical steel sheets adjacent to each other in a stacking direction and adheres the electrical steel sheets to each other,
wherein an adhesive forming the adhesion part contains an organic resin and an inorganic filler,
wherein a 50% particle size (D50) of the inorganic filler is 0.2 to 3.5 μm,
wherein a 90% particle size (D90) of the inorganic filler is 10.0 μm or less, and
wherein an amount of the inorganic filler is 5 to 50 parts by mass with respect to 100 parts by mass of the organic resin.

2. The adhesively-laminated core according to claim 1, wherein a maximum particle size of the inorganic filler is 30.0 μm or less.

3. The adhesively-laminated core according to claim 1, wherein the inorganic filler contains one or more selected from metal oxide and metal hydroxide.

4. The adhesively-laminated core according to claim 1, wherein the inorganic filler contains one or more selected from aluminum hydroxide and aluminum oxide.

5. The adhesively-laminated core according to claim 1, wherein the adhesively-laminated core is used for a stator.

6. A method of manufacturing the adhesively-laminated core according to claim 1,
wherein an operation of applying the adhesive to a part of a surface of the electrical steel sheet, stacking the electrical steel sheet on another electrical steel sheet, press-stacking the electrical steel sheets, and forming the adhesion part is repeated.

7. An electric motor comprising:
the adhesively-laminated core according to claim 1.

* * * * *